(12) United States Patent
Makonnen

(10) Patent No.: US 9,745,016 B1
(45) Date of Patent: Aug. 29, 2017

(54) SCOOTER SYSTEM AND METHOD OF USE

(71) Applicant: Jonathan Makonnen, Euless, TX (US)

(72) Inventor: Jonathan Makonnen, Euless, TX (US)

(*) Notice: Subject to any disclaimer, the term of this patent is extended or adjusted under 35 U.S.C. 154(b) by 0 days.

(21) Appl. No.: 15/236,095

(22) Filed: Aug. 12, 2016

Related U.S. Application Data

(60) Provisional application No. 62/204,870, filed on Aug. 13, 2015.

(51) Int. Cl.
| | |
|---|---|
| *B62K 15/00* | (2006.01) |
| *B62K 3/00* | (2006.01) |
| *B62J 9/00* | (2006.01) |
| *B62H 1/00* | (2006.01) |

(52) U.S. Cl.
CPC .............. *B62K 15/006* (2013.01); *B62H 1/00* (2013.01); *B62J 9/001* (2013.01); *B62K 3/002* (2013.01)

(58) Field of Classification Search
CPC .............................. B62K 3/002; B62K 15/006
See application file for complete search history.

(56) References Cited

U.S. PATENT DOCUMENTS

| | | | | |
|---|---|---|---|---|
| 7,451,848 B2* | 11/2008 | Flowers | ................. | A61G 5/045 180/208 |
| 7,886,855 B2* | 2/2011 | Wang | ..................... | A61G 5/045 180/65.1 |
| 8,801,010 B2* | 8/2014 | Deb | ........................ | B62J 7/00 224/42.11 |
| 9,016,702 B2* | 4/2015 | Huang | ...................... | B62J 1/08 280/87.041 |
| 9,504,901 B1* | 11/2016 | Lu | ........................ | A63C 17/017 |
| 9,533,729 B1* | 1/2017 | Chan | .................... | B62K 15/006 |
| 2016/0137254 A1* | 5/2016 | Lee | ........................ | B62K 11/02 180/208 |
| 2016/0297459 A1* | 10/2016 | Opsvik | .................. | B62K 3/002 |

* cited by examiner

*Primary Examiner* — Kevin Hurley
(74) *Attorney, Agent, or Firm* — Eldredge Law Firm; Richard G. Eldredge

(57) ABSTRACT

A scooter includes an elongated foot rest base extending from a first end to a second end; a first wheel secured to the first end of the foot rest base; a second wheel secured to the second end of the foot rest base; a pivot joint extend through a thickness of the foot rest base, the pivot joint being positioned between the first end and the second end; a locking mechanism secured to the foot rest base and configured to lock the joint in a fixed position; a backrest pivotally secured to the second end of the foot rest base; and a storage compartment rigidly secured to the backrest.

1 Claim, 3 Drawing Sheets

SCOOTER SYSTEM AND METHOD OF USE

BACKGROUND

1. Field of the Invention

The present invention relates generally to transportation systems, and more specifically, to a collapsible scooter system with a backrest, means of storage, kickstand and a back bar.

2. Description of Related Art

Scooter systems are well known in the art and are effective means of transportation and recreation. For example, FIG. 1 depicts a conventional scooter system 101 having a base 102 with two or more wheels 103 in communication with a steering structure 104. During use, the user stands on the base 102 and creates force by pushing off of the ground with one leg.

One of the problems commonly associated with system 101 is its lack of versatility. For example, to transport cargo using system 101, the user must use additional equipment such as a backpack (not shown).

Additionally, system 101 is unable to stand on its own when not in use and is cumbersome to store and transport.

Accordingly, although great strides have been made in the area of scooter systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
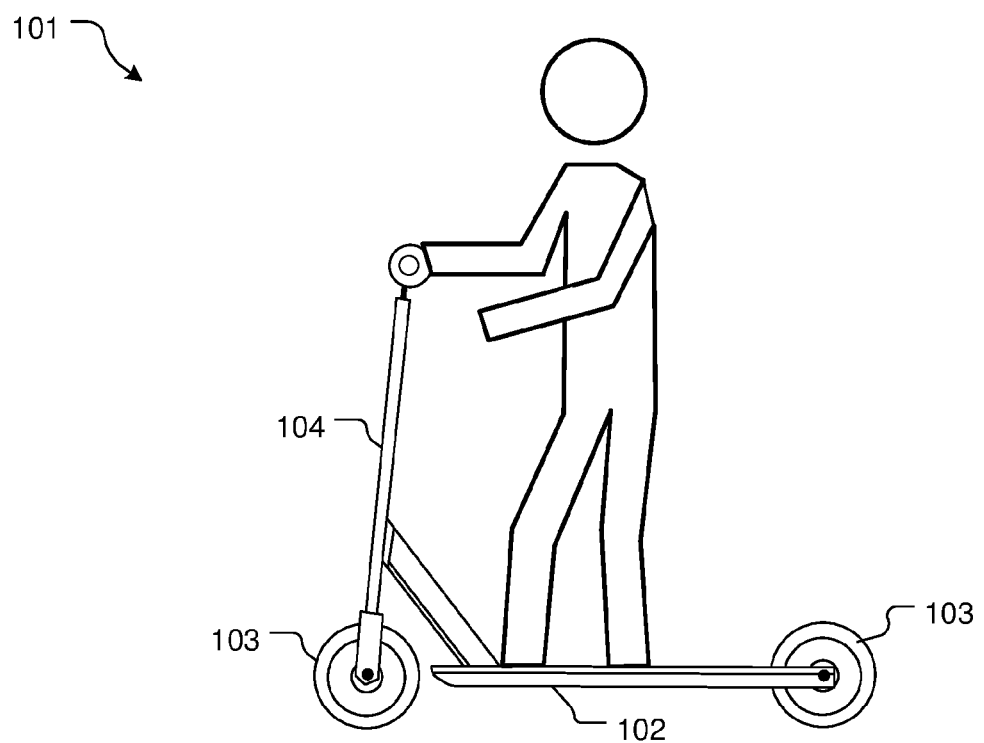
FIG. 1 is a side view of a common scooter system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional scooter systems. Specifically, the present application provides a method of cargo storage. In addition, the contemplated application provides additional features for improved stability and transportability. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
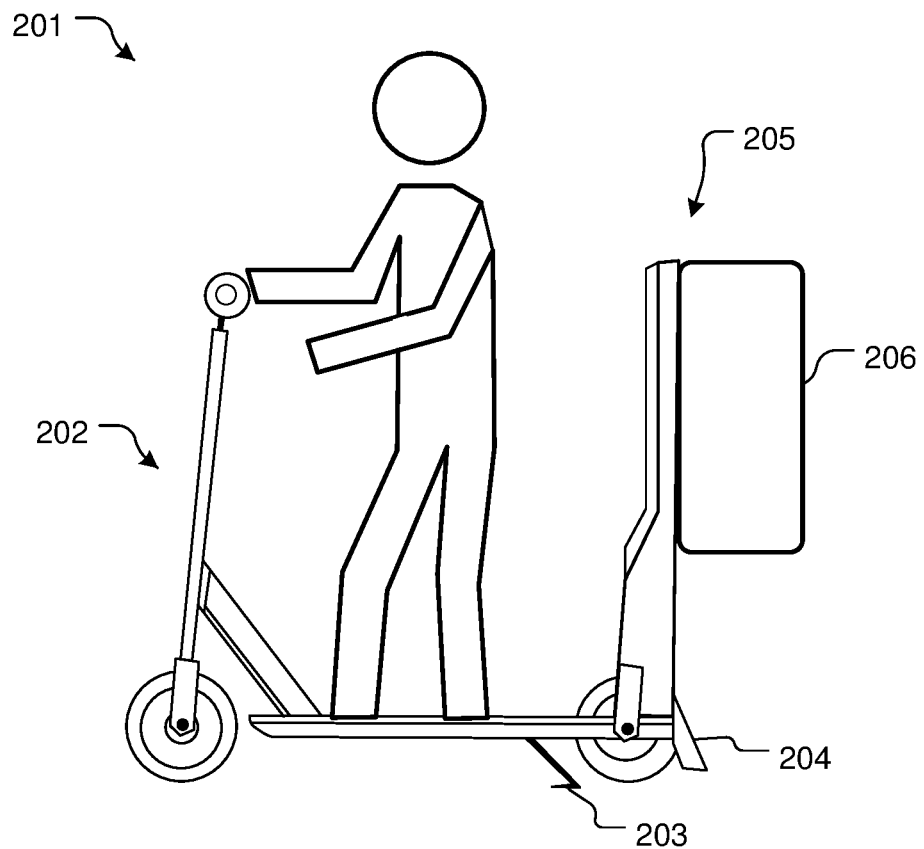
FIG. 2 is a side view of a collapsible scooter system in accordance with a preferred embodiment of the present application.

Referring now to the drawings wherein like reference characters identify corresponding or similar elements throughout the several views, FIG. 2 depicts a side view of a collapsible scooter system in accordance with a preferred embodiment of the present application. It will be appreciated that system 201 overcomes one or more of the above-listed problems commonly associated with conventional scooter systems.

In the contemplated embodiment, system 201 includes a scooter 202 featuring a kickstand 203, a back bar 204, and a back rest 205. In addition, the back rest 205 includes a means of storage 206. During use, the user stands on the scooter and creates force by pushing off the ground with one leg. Alternative embodiments contemplate that the scooter 202 can be either fully or partially motor-driven.

It should be appreciated that one of the unique features believed characteristic of the present application is the incorporation of an elongated backrest 205 rigidly secured to a foot base 302 adapted to ride on and with a means of carrying belongings via a storage compartment 206 and to transform the scooter in a collapsed position. It is contemplated that the backrest 205 can be cushioned for additional comfort and the means of storage compartment 206 may be permanent or removable and can vary in size, material, and style for functional or aesthetic purposes. It is further contemplated and should also be appreciated that various features, such as hooks, clips, or latches may be incorporated into/on the means of storage compartment 206 for further customization and/or improved functionality.

Another unique feature believed characteristic of the present application is the improved stability of system 201 through the inclusion of a kickstand 203 and back bar 204 on the scooter 202. It is understood that a kickstand 203 can be used to keep the scooter 202 upright while not in use. In addition, the back bar 204 can prevent the scooter 202 from falling back when the user leans against the backrest 205.

Figure 3A:
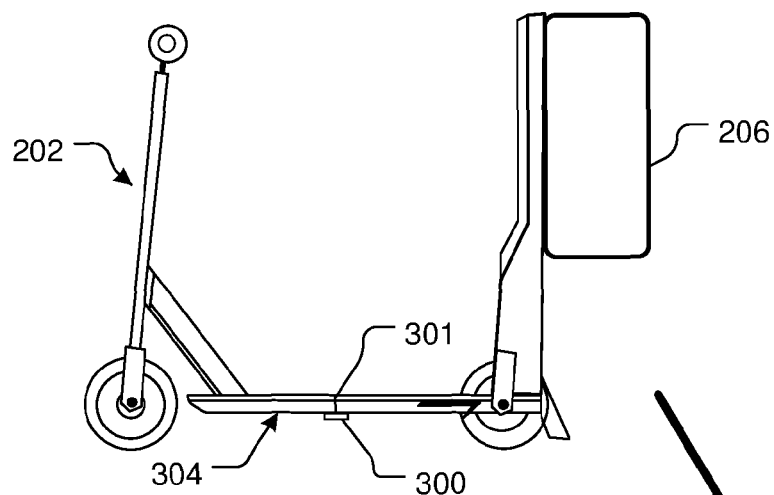
FIGS. 3A-3C show side views of a collapsible scooter system in accordance with a preferred embodiment of the present application at various stages of collapsing.
Figure 3B:
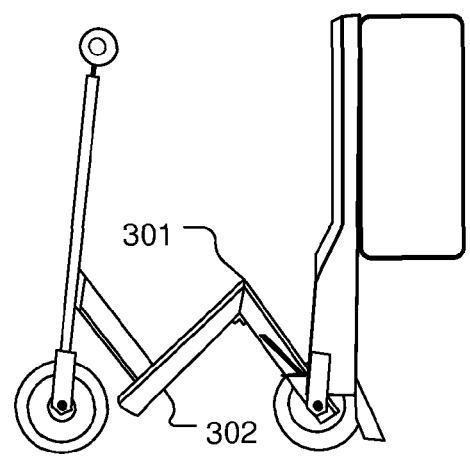
Figure 3C:
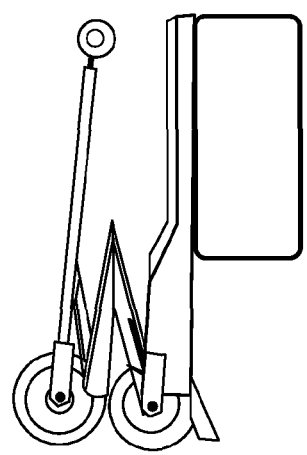

In FIGS. 3A, 3B, and 3C, various stages of the collapsibility of the scooter 202 are shown. In the preferred embodiment, it is contemplated that the scooter 202 can collapse via a joint 301 along the base 302 that is locked in position via a locking device 300 secured to a lower surface 304 of base 302. However, alternative embodiments contemplate collapsing via joints located at the front wheel and the back wheel.

In addition, it is contemplated that system 201 may be user propelled or motorized and may vary in the number of wheels, method of steering, and/or design of the base as functional, manufacturing, or aesthetic considerations require.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A scooter, comprising:
an elongated foot rest base extending from a first end to a second end;
a first wheel secured to the first end of the foot rest base;
a second wheel secured to the second end of the foot rest base;
a pivot joint extend through a thickness of the foot rest base, the pivot joint being positioned between the first end and the second end;
a locking mechanism secured to the foot rest base and configured to lock the joint in a fixed position;
a backrest secured to the second end of the foot rest base, the backrest having a rear facing surface:
a storage compartment rigidly secured to the backrest; the storage compartment having:
a first surface integral to the rear facing surface of the backrest; and
a stabilizing bar connected to and extending from the rear facing surface of the backrest to near a ground surface;
wherein the stabilizing bar prevents rearward tipping of the scooter.

* * * * *